United States Statutory Invention Registration [19]

[11] Reg. Number: H869

Weixel [43] Published: Jan. 1, 1991

[54] CONTACT INSERTION TURRET END EFFECTOR

[75] Inventor: Mark Weixel, Catonsville, Md.

[73] Assignee: The United States of America as represented by the Secretary of the Air Force, Washington, D.C.

[21] Appl. No.: 166,297

[22] Filed: Mar. 10, 1988

[51] Int. Cl.[5] ..... B25J 15/00

[52] U.S. Cl. ..... 414/736; 294/86.4

[58] Field of Search ..... 414/736; 901/30, 39, 901/48; 294/86.4

[56] References Cited

U.S. PATENT DOCUMENTS

| | | | |
|---|---|---|---|
| 3,084,811 | 4/1963 | Bower | 214/1 |
| 3,212,651 | 10/1965 | Specht et al. | 214/1 |
| 4,416,577 | 11/1983 | Inaba et al. | 414/226 |
| 4,449,883 | 5/1984 | Kampfmann | 414/744 A |
| 4,626,013 | 12/1986 | Barrows | 414/736 X |
| 4,710,884 | 12/1987 | Tokairin et al. | 901/48 X |

FOREIGN PATENT DOCUMENTS

| | | | |
|---|---|---|---|
| 1268406 | 11/1986 | U.S.S.R. | 414/736 |

*Primary Examiner*—Charles T. Jordan
*Assistant Examiner*—Michael J. Carone
*Attorney, Agent, or Firm*—Robert L. Nathans; Donald J. Singer

[57] ABSTRACT

A first end effector extends from a rotatable support in a first direction and has a tip portion extending in a second direction transverse to the first direction, and a second type of end effector extends in a third direction and has a tip portion extending in a fourth direction opposite the second direction, to enable contact insertion into a connector by either effector and regardless of the orientation in space of the connector.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTACT INSERTION TURRET END EFFECTOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of contact insertion end effectors.

Various types of end effectors are known in the art for inserting contacts into electrical connectors. Due to a wide variety of circumstances confronted when performing a contact insertion, a first type of end effector will operate reliably under a first set of conditions whereas a second type of end effector will be more desirable under different circumstances.

For example, a double pinch-push contact insertion end effector does not enter the connector and performs a contact insertion by progressively walking the contact into the connector. See for example my U.S. Pat. No. 4,598,469 for a detailed description of such an end effector. A tendency for the wire to buckle during insertion occurs, particularly where the wire is thin or the required insertion forces are considerable, when the wire is being pushed through a rubber grommet for example. Under these circumstances, a second type of insertion tool is more desirable, which pushes against the lip of the contact rather than walking the wire into the connector in the manner of the double pinch-push insertion end effector. However these insertion tools are more fragile than the pinch-push effectors. For a further discussion of insertion tool end effectors, reference may be made to my Statutory Invention Registration No. H225.

SUMMARY OF THE INVENTION

It is thus a principal object of the invention to easily and rapidly selectively position one of two types of end-effectors against the connector, regardless of the position in space of the connector.

This object of the invention is attained by providing first and second types of end effectors which are mounted in a back-to-back relationship upon a rotatable support device, which in turn is rotated by a motor to selectively position one of the end effectors in any position in space relative to a connector receiving contacts manipulated by the end effectors. A digital closed loop motor control circuit is provided for sensing and eliminating counter-rotation of an end effector during the insertion process, which would otherwise be produced by reaction forces of the connector against the tip of the active end effector.

BRIEF DESCRIPTION OF THE DRAWINGS

Other objects, features and advantages of the invention will become apparent upon study of the following detailed description taken in conjunction with FIGS. 1 and 2 which illustrate a preferred embodiment of the invention.

DETAILED DESCRIPTION OF A PREFERRED EMBODIMENT

Figure 1:
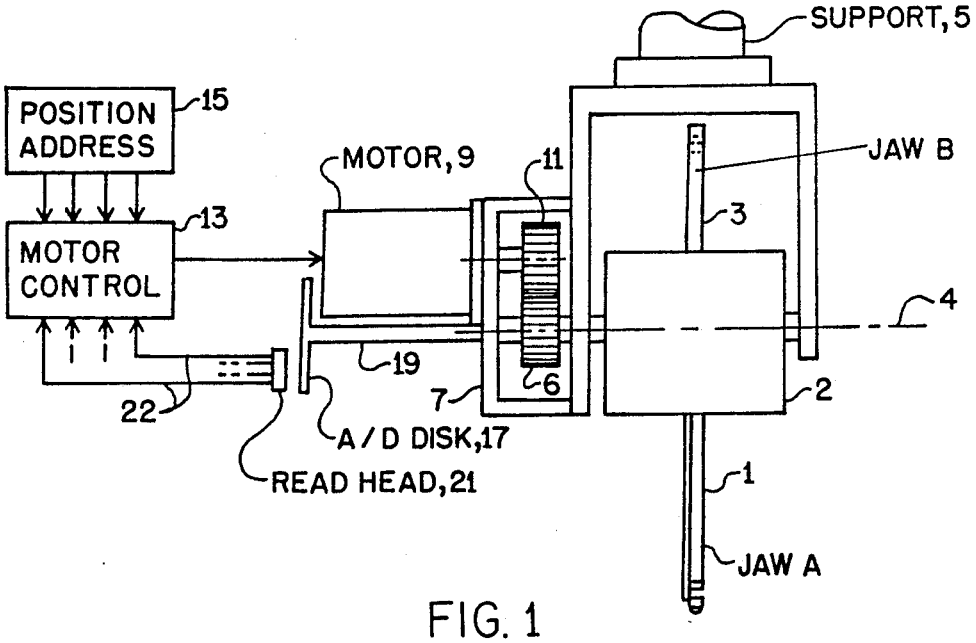
Figure 2:
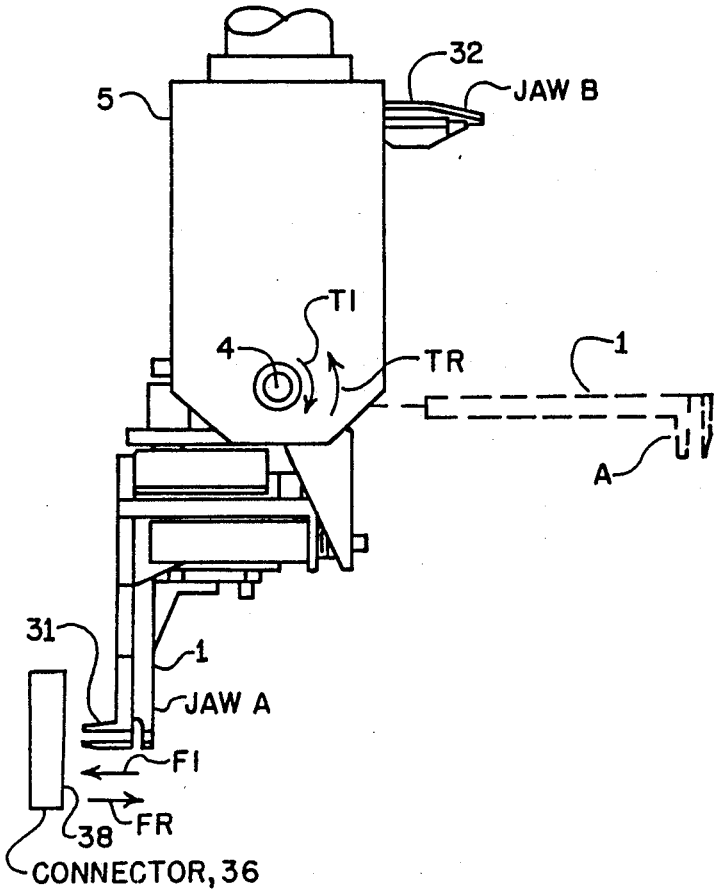

As shown in FIGS. 1 and 2, support 5 is utilized to support a rotatable end effector support means 2 having a first contact insertion end effector 1 mounted thereon, together with a second contact insertion end effector 3, mounted in a back-to-back relationship with respect to the first one. The rotatable support rotates about rotation axis 4 coincident with the rotation axis of gear 6 which is coupled to D.C. servo motor 9 via a second gear 11. Effector 1 preferably comprises the aforesaid double pinch-push contact insertion end effector, while effector 3 comprises the insertion type end effector. The insertion tip portion 31 comprises JAW A and extends in a direction substantially perpendicular to the elongated end effector 1 and tip portion 32 or JAW B of the insertion effector 3, extends perpendicular to end effector 3. The motor control means utilizes a digital closed loop feedback control circuit well known to workers in the art, and employs an analog to digital encoder disk 17 which is affixed to a shaft 19 driven by a gear 6. A conventional read head 21 is utilized to read the code in the various tracks of the circular disk to produce a binary code on leads 22, indicative of the absolute angular position of disk 17 and hence the angular position of the end effectors with respect to rotational axis 4.

Let it be assumed that JAW A is presently in the vertical position indicated by dotted lines at the right hand portion of FIG. 2. Connector 36 is to receive a contact driven by JAW A in a horizontal direction. Position address circuit 15 then generates a binary code indicative of a 90° rotation of effector 1 so as to position it as shown as solid lines at the bottom of FIG. 2. The motor control circuit 13 causes a current to pass through servo motor 9 to cause it to drive gears 11 and 6 and rotate the support device 2 until the binary code adjacent read head 21 indicates that a 90° rotation (clockwise) of rotatable support 2 has been produced. A comparator within motor control circuit 13 thus indicates a match between the position read by read head 21 and the address code produced by circuit 15, which reduces the current fed into the armature of servo motor 9 to cause JAW A to stop adjacent the vertically oriented side portion 38 of connector 36.

Since the details of the operation of the double pinch-push contact insertion end effector form no part of the present invention, reference should be made to my U.S. Pat. No. 4,598,469 for details of the operation of the end effector. As described in this patent, pneumatic air cylinders assert insertion forces against the wire contacts to be driven into the side of connector 36, such insertion forces being represented by the arrow labeled FI at the bottom of FIG. 2. However this causes a reaction force FR to be produced which causes the end effector to rotate in a counter clockwise direction represented by arrow TR about rotational axis 4. This causes a problem which is solved in accordance with the present invention. The rotation TR, following the torque producing by the force FI, causes a slight rotation of disk 17 in the opposite (counter clockwise) direction and the change in the digital code is sensed as a mismatch by the comparator of motor control circuit 13, which in turn increases the current flowing through the armature of motor 9 to produce a torque TI in a clockwise direction to maintain the JAW A in its proper position with respect to the vertically oriented connector 36. In other words, the mismatch at the comparator of control circuit 13 causes the motor to be driven again in a clockwise direction, as it was during the positioning of the end effector 1 from the horizontal position mentioned above to the vertical position against connector 36. In the interest of brevity, further details of circuit 13 will not be described since they are widely known and utilized by workers in the art.

Should it be desired to insert the wire contact in face 38 of connector 36 which may be horizontally oriented, end effector 1 would be driven to the position shown in dotted lines at the right hand portion of FIG. 2; any angular orientation of the face of connector 36 may be accommodated by appropriately angularly positioning the effector at the required angle. Should the second type of end effector such as the insertion type be utilized, the horizontally oriented JAW B would be moved 180° about axis 4, so that it is situated in the same position relative to the vertically oriented connector 36 as JAW A was previously. Thus it should be understood that either type of end effector may be positioned with respect to connector 36, regardless of its orientation in space, as the tip portions of the end effectors assume diametrically opposite positions with respect to rotational axis 4 and extend in opposite directions with respect to each other to enable simplified motor drive in one direction only, and for inserting wire contacts into connectors regardless of their orientation in space. The aforesaid closed loop motor control circuit is utilized to prevent the reaction forces from counter-rotating the end effectors away from the connectors.

It is understood that numerous variation may be made in the aforesaid embodiment and thus the scope of the invention is to be limited only by the terms of the following claims and art recognized equivalents thereof.

What is claimed is:

1. An electrical contact end effector machine comprising:

a. rotatable end effector support means having a rotational axis;

b. a first contact insertion end effector mounted upon said support means;

c. a second contact insertion end effector mounted upon said support means;

d. motor means for rotating said rotatable end effector support means to cause either said first end effector or said second end effector to assume a desired orientation with respect to an electrical connector; and e. motor control means for actuating said motor.

* * * * *